127,419

UNITED STATES PATENT OFFICE.

THOMAS C. KIER, OF PITTSBURG, PENNSYLVANIA.

IMPROVEMENT IN THE MANUFACTURE OF BRICKS.

Specification forming part of Letters Patent No. 127,419, dated June 4, 1872.

SPECIFICATION.

*To all whom it may concern:*

Be it known that I, THOMAS C. KIER, of Pittsburg, in the county of Allegheny and State of Pennsylvania, have invented a new and useful Improvement in such Bricks as are used in the surfaces of buildings.

It is well known that bricks, by being exposed to the action of the atmosphere, become liable to disintegration from various causes—moisture absorbed into their pores—the tendency of their particles to separate in consequence of undue expansion and contraction produced by the alternation or sudden change of temperature. To increase the durability of such bricks and prevent their destruction, whether arising from physical or chemical causes, is the principal object of my invention. To this end the bricks should be formed of good, well-tempered clay, in the usual and well-known manner, which, after allowing them to become partially dry, are submitted to intense pressure, by powerful machinery, in such strong, close molds as to increase their density by filling up the cells or interstices, and give them a greater smoothness and uniformity of surface and that precision of outline unattainable by any other means. The bricks so pressed are to be arranged in a kiln and burned or baked until they acquire the requisite solidity and firmness to support without crumbling the superincumbent mass they have to sustain.

When properly burned or baked, that end, edge, or side of each brick intended to form the outside surface of a wall is to be coated by dipping the same in a "slip" compounded of the following ingredients, to wit: Seventy-five pounds feldspar; ten pounds China clay; thirty pounds Paris white; ten pounds flint; thirty pounds oxide of zinc; fifty pounds carbonate of lead; ten pounds borax, ground together in sufficient water to constitute a thin, pasty mass, fluid enough to leave a smooth, even surface on the brick.

The bricks are subsequently placed in a furnace or kiln and sufficient heat applied to fuse and "fix" the glaze, thus giving to one side, end, or edge of each brick, as the case may be, a uniform, durable, vitreous coating, which may be colored to suit the fancy by the incorporation with the glazing-mixture above described of any of the well-known metallic oxides used for such purposes.

I wish it distinctly understood that I do not claim the glazing or vitrefaction of bricks on one or more sides. Neither do I claim any form or construction of brick or its mode of manufacture outside of my process; but I do claim—

As a new article of manufacture, a brick compressed by mechanical means, having the described glaze applied thereto in the manner and for the purposes hereinbefore set forth.

THOMAS C. KIER.

Witnesses:
JOSIAH W. ELLS,
S. M. KIER.